United States Patent Office 2,999,054
Patented Sept. 5, 1961

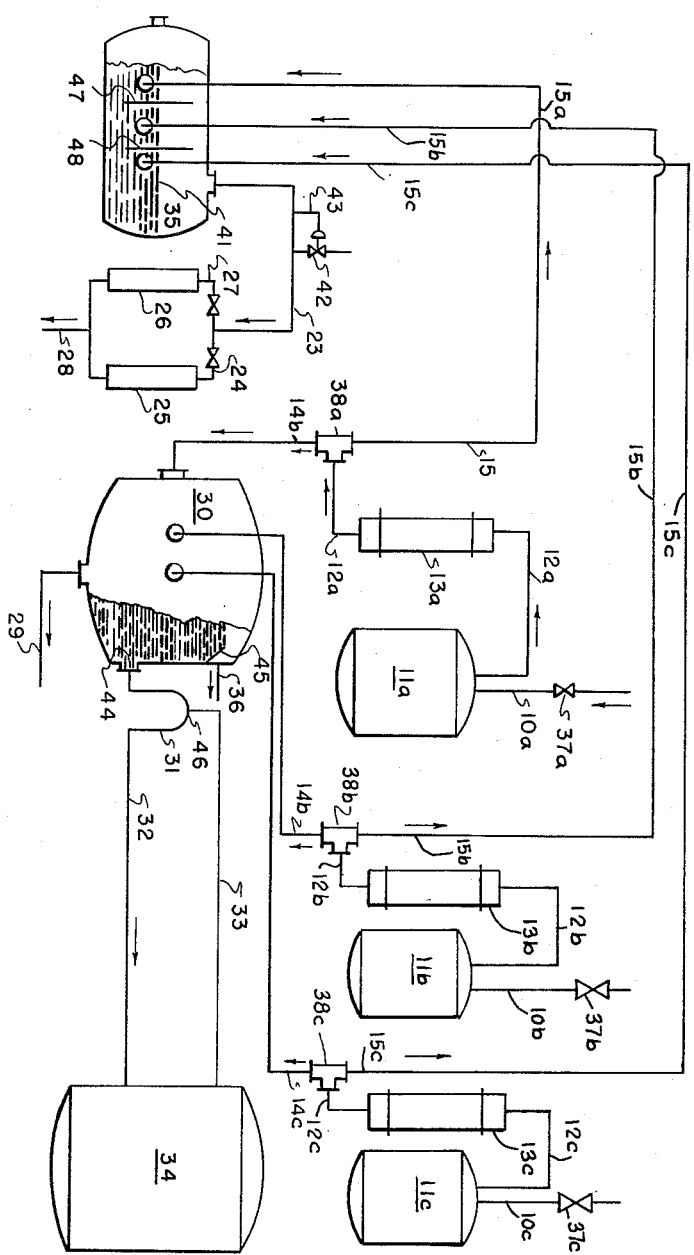

2,999,054
PURIFICATION OF TETRAETHYLLEAD
Billy J. Lentz, James F. McElderry, Jr., and Frank A. McCoy, Baton Rouge, La., assignors to Ethyl Corporation, New York, N.Y., a corporation of Delaware
Filed Feb. 28, 1958, Ser. No. 718,276
4 Claims. (Cl. 202—69)

This invention relates to improvements in process and apparatus for separating the volatile components of tetraethyllead reaction masses.

In the commercial process for manufacturing tetraethyllead, lead is reacted with sodium to form monosodium lead alloy. The monosodium lead alloys contacted with an excess of ethyl chloride in an autoclave. The excess ethyl chloride, after reaction is complete, is then vented from the autoclave. The reaction mass thus obtained comprises a heterogeneous mixture of sodium chloride, lead, tetraethyllead, very minor amounts of sodium lead alloy, residual amounts of ethyl chloride and some impurities. The impurities are produced largely because of impurities originally present in the lead. Such impurities, especially bismuth, also react with ethyl chloride to form organometallic compounds which are carried over with other volatile components during the steam distillation. These compounds tend to decompose and form sludge.

The reaction mass is introduced into a steam still containing a relatively large volume of water. The tetraethyllead must be removed by steam distillation but, of course, it is not the only volatile component of the reaction mass. The mixture then is agitated and steam passed therethrough. The first component off the still is ethyl chloride and following this there is emitted water vapor, tetraethyllead, impurities and entrained fine lead solids.

The present operating technique requires, prior to beginning the distillation, the opening of a vent line into which the ethyl chloride is sent, and the closing of a water overflow valve from a receiver vessel provided for the components liquefied by a condenser for the steam still vapors. This being done, steam is introduced into the still. The initial vapors off the still, predominantly ethyl chloride, are passed through the still condenser and then into the vent line. As the ethyl chloride continues to evolve from the still the amount of water vapor contained therein begins to increase. This is accompanied by a corresponding rise in temperature which is observed by the operator. Installed within the line to the receiver also is a sight glass by means of which condensed liquids can be seen upon appearance in sufficient quantities. As the amount of water and tetraethyllead condensate increase to a certain amount, determined by the discretion of the individual operator, the overflow valve from the still receiver is opened and the vent line is closed. After the tetraethyllead has been distilled over, as is also determined by the discretion of the operator who watches for the appearance of tetraethyllead within a sight glass located within the line, the distillation is stopped and the tetraethyllead allowed to settle to the bottom of the receiver. The operator then opens a line leading from the bottom of the still receiver and allows the tetraethyllead, after weighing the charge received therefrom, to drain into a tetraethyllead-water separator. After separation of the tetraethyllead from the water the operator opens a line and draws off the tetraethyllead therefrom.

The foregoing method, then, relies heavily upon the individual diligence and discretion of the operators whose judgment may be variable. The amount of time lost in the opening and closing of valves for the individual units is large, especially when it is considered that one operator must handle as many as eighteen units during a relatively short period. This is of course a serious deficiency in this process. In addition, this portion of the process has been hampered by other deficiencies which have long been recognized and studied but have not been solved.

An object of the present invention is to provide a new and improved process, as well as apparatus, for the efficient distillation of tetraethyllead reaction masses and to eliminate the necessity of manual attention and much labor at this point in the process. Another important object is to eliminate human error, thereby assuring higher yields of tetraethyllead and the more efficient recovery of ethyl chloride. Yet another object is to eliminate the cost of expensive equipment as well as the cost of maintenance thereof. Other objects will appear hereinafter.

The present invention provides apparatus and a new and improved process whereby the above objects are attained and many of the deficiencies of prior practice are overcome. The invention provides a process for treating and separating streams from a plurality of batch distillations of tetraethyllead reaction masses wherein the distillations are programmed on a staggered chronological schedule. The individual streams are characterized in that they have a variant composition and upon distillation produce an initial flow of a preponderance of ethyl chloride and finally a flow of a preponderance of water vapor, tetraethyllead, impurities and entrained fine lead solids or sludge. Broadly, the invention comprises the steps of passing the vapor streams produced from the initial flow from a plurality of units, through a common aqueous liquid seal and concurrently cumulating them to form a single vapor stream which is predominantly ethyl chloride and entrained water. The ethyl chloride is then condensed. Next, the tetraethyllead containing vapors from terminal portions of individual batch distillations and most of the water vapor from each stream are condensed. The liquid condensates are a heterogeneous liquid system with very minor proportions of solids including water, tetraethyllead, impurities and entrained solids. The individual liquid streams are continuously cumulated and stratified providing a surmounting aqueous layer, an intermediate substantially solids free tetraethyllead layer, and a bottom layer composed principally of impurities and fine lead solids or sludge, having a total constant depth. The tetraethyllead depth is also continuously maintained constant between certain narrow limits by a "self balancing" technique defined hereinafter. The layers are separated by continuously withdrawing an overflow aqueous layer and an intermediate tetraethyllead layer while settling the impurities and particularly the entrained lead solids layer or sludge for intermittent withdrawal.

The foregoing process steps are performed in certain principal operating sections. These include a plurality of steam stills, each of which includes a condenser and a liquid-vapor separator within its vapor withdrawal line. Vapor conducting lines and liquid conducting lines are extended from each of the liquid-vapor separators. The vapor conducting lines extend to a liquid seal tank, which contains a line for conducting the accumulated vapors to a heat exchange means, and the liquid conducting lines extend to an automatic or continuous liquid separator, in combination with a supplemental tetraethyllead standpipe for providing a continuous draw-off line and concurrently an automatic dual control of the drawoff and stratifying operations as discussed more fully below.

From the detailed description hereafter, it will be apparent that the apparatus described generally above is particularly effective for the continuous operation of a plurality of distillation units, especially when operated serially on a chronological or cyclic staggered time schedule. The advantages and best method of operating the process are more easily understood from the description and working example hereinafter and the accompanying figure which is a schematic flow sheet and apparatus layout.

Referring to the figure, the operation of a single distillation unit or steam still will first be discussed. The discussion, however, is for simplicity of illustration. It refers to the operation of a plurality of single steam stills but is not intended to be limiting. Obviously, several steam stills can be grouped to begin operation on a certain schedule and other stills grouped to begin operation at various succeeding intervals. The main components of the apparatus include a seal tank 35 and a separator 30 or separatory vessel. A tank 34 is provided to receive tetraethyllead liquid. A plurality of stills 11a, 11b, and 11c are provided to process the tetraethyllead reaction masses. Vapor withdrawal lines 12a, 12b, and 12c pass from the steam stills 11a, 11b, 11c to condensers 13a, 13b, 13c, and thence to liquid vapor separators 38a, 38b, 38c. Feed of reaction masses to the steam stills 11a, 11b, 11c is provided through lines 10a, 10b, 10c having shut-off valves 37a, 37b, 37c.

In operation a tetraethyllead reaction mass is introduced through line 10a into a steam still 11a, which contains water. The valve 37a is closed and steam introduced into the steam still 11a through steam jets (not shown). Initially, predominantly ethyl chloride vapor evolves from the steam still 11a through the vapor withdrawal line 12a. The vapor passes through the condenser 13a, is cooled without being condensed, and continues through line 12a into the liquid vapor separator 38a. The vapor then passes through line 15a into the seal tank 35 where it is introduced below a liquid level 41 maintained therein. Baffles 47, 48 intersect the liquid and vapor space. This prevents much of the surface disturbance of the liquid by the entering vapor. After the principal portion of the ethyl chloride vapor has evolved from the still 11a some water vapor and tetraethyllead begin to distill over and is condensed within the condenser 13a. Thus, vapor and liquid begin to enter the liquid separator 38 from the vapor withdrawal line 12a. These components are therein separated and the ethyl chloride vapor passed through vapor line 15a to the seal tank 35 while the liquid portion is sent through the line 14a into the separator 30.

Following the placing of steam still 11a in operation, a second still (11b) is placed in operation. Following this, a third still 11c is placed in operation. The time schedule is not critical and is determined for the convenience of the overall operation. The vapor withdrawal lines 12b, 12c from these stills 11b, 11c enter the liquid-vapor separators 38b, 38c respectively. Ethyl chloride vapor from these stills passes through the lines 15b, 15c and enters the seal tank 35 while the liquid, when it begins to distill over, passes through lines 14b, 14c into the separator 30. The effect of the overall operation is that ethyl chloride vapor is being continuously received within the seal tank 35 and liquid is being continuously received into the saparator 30.

The vapor from these units is brought together or cumulated within the vapor space of the seal tank 35 and sent through line 23 for further processing, described hereinafter. Thus, though the operating pressure of the various distillation units differ, there is no impairment in the efficiency of operation. This is because of the effectiveness of the liquid seal of the seal tank 35 which effectively seals off each unit from the other. Thus, the pressure within the vapor space of the seal tank 35 is determined by the still operating at the greatest pressure. A single still, operating at a lower pressure can force its vapor into the vapor space only when it has built-up an equal or slightly greater pressure. The still, having a lower pressure than that within the seal tank 35, then, cannot discharge its vapor and so the vapors therein build up until its pressure is equal to or slightly greater than the pressure within the seal tank 35. It then discharges its vapors. On the other hand, the unit operating at a greater pressure cannot force vapor into the unit operating at a lower pressure because of the liquid seal. While a unit evolving a lesser quantity of vapor is not discharging vapor into the vapor space of the seal tank 35 liquid 41 from the seal tank rises into its vapor line which extends below the liquid surface and equalizes the pressure.

The ethyl chloride vapor cumulated within the vapor space of the seal tank 35 is then removed therefrom and condensed. Heat exchangers 25, 26 are similar units connected in parallel for alternate use. The ethyl chloride vapor is then sent from the seal tank 35 through lines 23, 24 and into the heat exchanger 25 which is kept at a low temperature. The greater portion of the ethyl chloride vapor is liquefied and passes out of the heat exchanger 25 through line 28 to storage. An alternative route is from lines 23, 27 through the heat exchanger 26 so that one of the units can be repaired while the other is in operation. Occasionally, there will be a pluggage within the heat exchangers 25, 26 and the ethyl chloride cannot pass therethrough. A safety feature is therefore provided. A vent line 42, provided with a pressure control regulator 43 is located within line 23. This vents the ethyl chloride vapor to the atmosphere when the pressure within the system becomes excessive.

Liquid, from the distillation units, consisting of tetraethyllead, water, and sludge flows through lines 14a, 14b and 14c in a substantially continuous stream into the continuous separator 30. The liquid is introduced into the continuous separator 30 at substantially the tetraethyllead water interface wherein the maximum settling rate is accorded the individual liquid and solid components. The water is separated from the tetraethyllead in an upwardly direction and the heavier impurities and solids are separated from the tetraethyllead in a downwardly direction. The separation of these components takes place readily and forms a stratified three phase layer. A constant total liquid level is maintained by providing for the continuous overflow of water when it reaches a predetermined level. The water flows over a weir 45 located within the upper portion of the separation 30 and is conveyed through the overflow line 36 to the outside of the separation 30. The intermediate tetraethyllead layer is also maintained at a more or less constant level by continuously withdrawing tetraethyllead through line 32 and storing it within the tank 34. This is accomplished in the manner described below.

The loop seal 31 within the line 32 is of such calculated height that tetraethyllead will automatically flow therethrough when the depth of tetraethyllead within the separator 30 rises above a certain level. The flow automatically ceases when the depth of the tetraethyllead within the separator 30 falls below a certain level. Stated in more basic terms, the flow of tetraethyllead through the loop seal 31 occurs when the total pressure head within the separator 30 above the entrance 44 of the loop seal 31 is greater than the total pressure head of a column of tetraethyllead in the lop seal 31, between the entrance 44 thereto and the apex 46 thereof. These terms are further defined as follows: the total pressure head within the continuous separator 30 is the summation of the pressure exerted by the depth of the tetraethyllead above the entrance 44 to the loop seal 31, the pressure exerted by the depth of water and the pressure exerted by the gas above the liquids within the separator 30. The total pressure head within the loop seal 31 is the summation of the pressure exerted by the depth of tetraethyllead contained within the loop seal 31 between its entrance 44 and apex 46 and the gas pressure, if any, exerted upon the apex 46 of the loop seal 31. When the total pressure head within the separator 30 is equal to or less than the total pressure head within the loop seal 31, there is no flow through the loop seal 31. When the total pressure head within the separator 30 is greater than the total pressure head within the loop seal 31 there is a flow of tetraethyllead therethrough. The separator 30 is designed and operated so that the total pressure head within the continuous separator 30 is never great enough to permit water flow through the loop seal 31 by discharging the tetraethyllead content, or in fact, to permit water access to the seal line 31. This stems from the fact that water is of lesser density than tetraethyllead and if there is an increase in the depth of water, then there must correspondingly be a decrease of the depth of the tetraethyllead, and hence, assuming a constant gas pressure, the total pressure head is lessened. By limiting the total liquid depth, ignoring the pressure of the gas since its effect can be nullified as hereinafter defined, the total pressure exerted by the water head can be kept so that it can never become greater than the total pressure exerted by a column of tetraethyllead in the seal line 31, between its entrance 44 and its apex 46. This result is accomplished by designing the separator 30 so that it cannot contain a total liquid depth or height above the entrance 44 of the loop seal 31 greater than the 1.62 times the height of the loop seal 31.

Siphoning of the contents of the continuous separator 30 is prevented by means of the pressure equalizer line 33 which joins the apex 46 of the loop seal 31 with the tank 34 into which the tetraethyllead is discharged. This nullifies the pressure drop or vacuum produced on the downstream side of the apex 46 of the loop seal 31 which would produce siphoning. If it were desired to utilize a significant amount of pressure within the separator 30, a pressure greater than the pressure maintained within the storage tank 34, its effect could be nullified by equalizing the gas pressure within the separator 30 with the apex 46 of the loop seal 31. This is done by means of an equalizer line (not shown) connected between the top of the separator 30 and the apex 46 of the loop seal 31. In general, however, it is preferred to apply a slight vacuum upon the separator 30. It has also been found generally desirable to supply a slight positive pressure of about 10–15 inches of water, upon the tank 34 into which the tetraethyllead is stored. This pressure is also transmitted to the apex 46 of the loop seal 31 by means of the equalizer lines 33.

The bottom, or sludge layer in the separator 30 is drawn off through line 29 either continuously or intermittently depending upon the rate of accumulation. Accumulation of the sludge therein is highly variable and is dependent upon process conditions.

The advantages and benefits of the process as well as the mode of operation are illustrated by the following working example. Two distinct groups of stream stills are placed in operation in chronological order. The first group of four stills is arranged in parallel but manifolded from the liquid-vapor separator of each into a common vapor line 15a which enters into the seal tank 35 below the liquid level 41. The second group of four stills is also arranged in parallel and manifolded from their liquid-vapor separators to a comon or second vapor line 15b which also enters into the seal tank 35 below the liquid level 41. The liquid condensate from each group of stills is also arranged in parallel and manifolded from their vapor-liquid separators to group headers (not shown). Thus the two groups are in effect separated or isolated with respect to the vapor and liquid produced. All flow rates in the example are given in gallons per minute and compositions are in parts by weight, except as otherwise specified.

*Example*

Charges of the following approximate average composition are provided in each of the eight stills.

| | Parts |
|---|---|
| Water | 1250 |
| Sodium chloride | 443 |
| Tetraethyllead | 552 |
| Metallic lead | 1208 |
| Unreacted lead sodium alloy | 39 |
| Ethyl chloride | 25 |

The first group of four stills is first placed in operation. Steam is introduced into each of the reaction mixtures as the mixtures are agitated. Ethyl chloride begins to distill over from each still almost immediately and is collected and conducted through the ethyl chloride vapor line 15a to the seal tank 35. At the end of about 15–20 minutes most of the ethyl chloride has distilled over and then water, tetraethyllead and some impurities begin to evolve from the stills. Liquid begins to condense within the condensers. The ethyl chloride and liquid is effectively separated at each of the vapor-liquid separators, the ethyl chloride vapor being conveyed through line 15a to the seal tank 35 and the liquid therefrom being sent through line 14a to the continuous separator 30.

An average of about 23 gallons per minute of tetraethyllead, water and some impurities enters the continuous separator 30 from the four stills. Water overflows at a rate of about 19 gallons per minute and tetraethyllead at a rate of about 4 gallons per minute. A nitrogen pressure of about 10 inches of water is maintained within the tetraethyllead receiving tank 34 and also upon the apex 46 of the loop seal 31. Sludge accumulates within the continuous separator 30 very slowly.

A pressure of about 20 inches of water is produced within the vapor space of the seal tank 35. Toward the end of an 18 minute period this pressure drops to nearly atmospheric pressure.

About one hour after the first group of stills has been placed in operation, the second group of four stills is placed in operation. Distillation is conducted as in the foregoing, the total effluent from the stills being approximately equal to the quantities heretofore described as would be expected. The ethyl chloride vapor pressure within the seal tank 35, which had dropped to nearly atmospheric pressure because of the diminishing quantity of ethyl chloride vapor supplied thereto by the first group of stills, again builds up to about 20 inches of water. The seal tank 35 separates the two groups of distillation units very effectively.

Liquid is also continuously conveyed through line 14a to the separator 30 at a rate of approximately 17 gallons per minute. This causes water to overflow at a rate of 14 gallons per minute.

From the foregoing example it is apparent that the process and apparatus described is well calculated to achieve the objects stated heretofore.

The minimum size of the seal tank is largely determined by the size of the vapor lines which enter therein and by the differential pressure between the distillation units or groups of units, operating on a chronological shedule. It is desirable to maintain a substantially constant liquid level within the seal tank 35. The preferred level is about 4 inches above the nearest side of the internal diameter of the line which delivers the vapor. The larger the inside diameter or opening of the lines, the more liquid can enter therein and thus lower the liquid level within the seal tank 35. Also the greater the differential pressure between the stills, or groups of stills, the higher within the lines the liquid will rise. It follows then, that the greater the volume of liquid contained within the top four-inch layer of liquid within the seal tank 35, the less the liquid level will change with change in pressure since this is the liquid which will be forced into the line. It is known also that a horizontal vessel of elongated shape will offer greater capacitance than the same, or a vessel of equal volume standing in a vertical position. Generally it is found desirable to employ a horizontal seal tank 35 on the order of about 3 feet in diameter and approximately 6 feet in length when employing entering vapor lines of six inch internal diameter. The liquid level is maintained at a maximum depth of 1½ feet, i.e. the seal tank 35 is filled to one-half its total volume with water or any other liquid inert to the ethyl chloride vapor.

The pressure maintained within the vapor space of the seal tank 35 is somewhat variable during operation. Generally, the preferred range of operating pressure is between about 0 inch of water and 20 inches of water. It is also desirable in most instances to employ baffles which intersect the liquid vapor space within the seal tank 35 to calm the surface of the liquid which is agitated by the entering ethyl chloride vapor. The baffles do not completely separate the seal tank 35 into compartments.

The liquid separator 30 can also be of variable design. It is preferable to maintain a constant water level within the separator 30 by providing a weir 45 at uniform height around the entire internal circumference thereof. The water within the separator 30 is then removed at a certain level from around the entire periphery of the separator 30 or is maintained at a constant level therein by overflowing the weir 45. The overflow water is removed from the separator through the overflow line 36. Use of a weir 45 offers certain advantages. The water rising from the interface of the tetraethyllead and water where the liquid, water with entrained tetraethyllead and impurities, is introduced carries a small amount of entrained tetraethyllead. The entrained tetraethyllead is subject to only slow uniform action by the overflowing of the water in the manner aforesaid. This is because of the reduction of upward currents or channels which would be caused if the water overflowed through one, or a few, outlets. These currents, if formed, would sweep tetraethyllead upward and out with the water without the tetraethyllead particles being able to settle downward.

A less preferred embodiment of the invention is to use a single vessel or tank for receiving the ethyl chloride vapor and also to collect the condensed liquid. Thus a constant water level can be maintained above the tetraethyllead, as in the preferred embodiment, and the ethyl chloride vapor introduced at the preferred depth below the surface of the water therein. The separate ethyl chloride vapor streams can then be cumulated and passed along for treatment as in the preferred embodiment.

It has also been found desirable, as was suggested in the above paragraph, to introduce the liquid from the stills into the separator 30 at the tetraethyllead water interface. At this point the tetraethyllead and impurities are afforded their maximum settling time. The liquid introduced into the separator 30 is principally water with tetraethyllead and minor impurities suspended therein. The accumulation of the impurities or sludge is largely determined by process conditions. Under preferred conditions it has generally been found that the sludge does not accumulate within the separator 30 in greater amounts than about one-half gallon per hour. The sludge is usually withdrawn therefrom every twenty-four hours.

Generally it is desirable that the volume of the separator afford an average tetraethyllead residence time of at least about 20 minutes and an average water residence time of at least about 120 minutes. This average tetraethyllead residence time affords sufficient time for the settling of the sludge to the bottom of the separator and only a negligible amount is entrained with the tetraethyllead which is sent through the loop seal 31. Generally it is desirable to maintain a total water depth in the range of from about 2 feet to about 3 feet, and a total tetraethyllead depth of from about 2.5 feet to about 4 feet within the separator 30. These depths, in conjunction with the stated residence time, assures a high and effective degree of stratification, i.e., separation of water upwardly and tetraethyllead downwardly, and accumulation of minor solids impurities in the lowest position. In a typical embodiment, as in the above example, the water level is maintained at a total depth of about 2 feet 10 inches and the tetraethyllead at a total depth of abou 3 feet 2 inches within the separator. In addition, the tetraethyllead layer is preferably maintained at a height of 1 foot 7 inches above the entrance 44 to the loop seal 31. The accumulated sludge is usually drained off when it becomes about 1 inch in depth.

In the actual chronological operation of the stills the flow of liquid from the distillation units into the separator 30 is variable. The preferred method for operating the process is such that the distillations are conducted at such intervals of time that the liquid streams therefrom will flow as an almost constant and continuous stream into the separator 30. It has been stated that the liquid streams are of variant composition and that the total amount of liquid over at any time is also variable. Thus, at start up only ethyl chloride vapor is evolved from a still. At some time thereafter, 15 to 20 minutes, liquid begins to condense therefrom. Some time thereafter the quantity of liquid evolved from a still reaches a peak, 30 to 40 minutes from start up, and continues for a time, approximately 1 hour. The quantity of liquid evolved then begins to diminish until at the end of approximately two hours no tetraethyllead remains in the stream. It follows then that the lower the intervals of time in which the stills, or groups of stills, are placed in operation the more constant will be the flow of liquid. Under ideal conditions the flow fluctuates within a comparatively narrow range, typically about 10 percent of maximum flow rates.

The total head of liquid within the continuous separator 30 is largely determined by the desired operating conditions. The ideal height at which tetraethyllead would continuously overflow, and at which the water head would be insufficient to force the last amount of tetraethyllead within a 32½ inch seal is any height less than 52.65 inches assuming a negligible gas pressure within the separator 30 and at the apex 46 of the loop seal 31. The effect of siphoning can be prevented by the use of a vent line 33 which equalizes the pressure at the apex 46 of the loop seal 31, with that of the separator 30 from which the tetraethyllead is being discharged. A greater pressure will also break this seal.

It is generally found desirable to employ a positive nitrogen pressure of about 10 inches of water upon the tetraethyllead storage tank 34 and also upon the apex 46 of the loop seal 31. This is normally done to prevent the tetraethyllead from being exposed to the oxygen of the atmosphere.

Obviously many other variations may be made within the process and apparatus without altering the spirit and scope thereof.

What is claimed is:

1. A process for treating and separating components from a plurality of batch distillation streams from tetraethyllead reaction masses, said distillations being programmed on a staggered chronological starting schedule, and each of said streams having a time variant composition and being supplied at pressures varying during said distillation and further being characterized by having an initial portion predominating in ethyl chloride and a final portion predominating in water vapor, tetraethyllead, and containing also entrained fine lead solids and impurities, comprising; cooling each stream to a temperature insufficient to condense any ethyl chloride in the initial portion of said stream but sufficient to condense virtually all the tetraethyllead and water in the final portion of said stream, disengaging uncondensed vapors from said stream after said cooling, said vapors being obtained from the initial portion of the distillation stream and comprising substantially only ethyl chloride, and passing said vapors through an aqueous liquid seal, and cumulating said vapors with corresponding vapors from other distillation streams, and then cooling the cumulated vapors passed through said seal sufficiently to condense the ethyl chloride; accumulating the tetraethyllead and water condensed by said cooling of the final portion, with corresponding liquids from other distillation streams and forming a heterogeneous liquid-solid system including water, tetraethyllead, impurities and entrained solids, and stratifying the said system into a surmounting aqueous layer, an intermediate substantially solids free tetraethyllead layer, and a bottom layer including impurities and finely divided lead solids, said stratified layers having a constant total depth, and continuously withdrawing an overflow aqueous stream and a tetraethyllead stream and accumulating the bottom layer including impurities and lead solids, the interface of the aqueous-tetraethyllead layers being maintained at a substantially constant elevation.

2. The process of claim 1 further defined in that the final portion of the batch distillation streams, upon condensation of the tetraethyllead and water therein, are fed to the heterogeneous liquid-solid system substantially at the interface of the tetraethyllead-water layers.

3. In a process for separating components from a plurality of batch distillation streams from tetraethyllead reaction masses, said distillations being programmed on a staggered chronological starting schedule, and each of said streams having a time variant composition and further being characterized by having an initial portion predominating in ethyl chloride and a final portion predominating in water vapor, tetraethyllead, and containing also entrained fine lead solids and impurities, the improvement comprising cooling each stream to a temperature insufficient to condense any ethyl chloride in the initial portion of said stream but sufficient to condense virtually all the tetraethyllead and water in the final portion of said stream, dis-engaging uncondensed vapors from said stream after said cooling, said vapors being obtained from the initial portion of the distillation stream and comprising substantially ethyl chloride, and accumulating the tetraethyllead and water condensed by said cooling of the final portion, along with the entrained fine lead solids and impurities, with corresponding condensed portions from other distillation streams, and forming a heterogeneous liquid-solids system including water, tetraethyllead, impurities and entrained solids, and stratifying the said system into a surmounting aqueous layer, an intermediate substantially solids free tetraethyllead layer, and a bottom layer including impurities and finely divided lead solids, said stratified layers having a constant total depth, and continuously withdrawing an overflow aqueous stream and a tetraethyllead stream and accumulating the bottom layer including impurities and lead solids, the tetraethyllead stream being discharged from the stratified tetraethyllead layer as an upwardly rising column from a tetraethyllead discharge point to a tetraethyllead overflow point, and the aqueous stream withdrawal point being at a height, not more than 1.62 times the height of the said tetraethyllead discharge column, above the tetraethyllead discharge point, whereby the tetraethyllead discharge column balances the stratified aqueous layer and the tetraethyllead layer above said discharge point and preserves the interface of the water-tetraethyllead layers at a substantially constant elevation.

4. Apparatus for the treatment and resolution of streams from a plurality of distillation units for the batch distillations of tetraethyllead reaction masses, said distillations being programmed on a chronological schedule, each of said streams having a variant composition and being characterized by an initial portion predominating in ethyl chloride, and by a final portion predominating in water vapor, tetraethyllead, and containing impurities and entrained fine solids particles, said apparatus including; vapor withdrawal conduits from each of said distillation units, said conduits each having heat exchange means forming a portion thereof, each of said vapor withdrawal conduits bifurcating into a vapor conduit and a liquid conduit, each of said vapor conduits connecting to a seal tank at an intermediate level, said seal tank being capable of receiving a liquid and of being filled therewith to a level slightly above the entering vapor conduits, and said seal tank having internal vertical baffles which separate the entrances of the vapor conduits, and the terminus of each of the said liquid conduits passing to a separator vessel and connecting thereto at an intermediate vertical position, said separator vessel having an internal overflow weir and a conduit adjacent the top of said vessel for removing the overflow liquid, a bottom discharge conduit at the lowermost point thereof, and an intermediate take-off conduit connecting the separator vessel to a tetraethyllead storage zone, said intermediate take-off conduit having a generally vertical loop seal portion extending above the intermediate point of take-off and being such that the total liquid head in the separator vessel is sufficient to elevate tetraethyllead through said loop seal when the tetraethyllead-water interface within the separator rises above a certain level at which the tetraethyllead head within the loop seal and the total available liquid head within the separator are equal, and the total available liquid head within the separator vessel is insufficient to elevate tetraethyllead through said loop seal when the tetraethyllead interface within the separator vessel is below said level, and a pressure conduit connecting the top of the seal portion of the intermediate take-off conduit with a vapor space in said tetraethyllead storage zone, thereby providing gas pressure to prevent siphoning through said conduit.

References Cited in the file of this patent
UNITED STATES PATENTS

| | | |
|---|---|---|
| 2,310,806 | Nourse | Feb. 9, 1943 |
| 2,543,971 | Houpt et al. | Mar. 6, 1951 |
| 2,777,867 | Giraitis et al. | Jan. 15, 1957 |
| 2,856,419 | Neher et al. | Oct. 14, 1958 |